United States Patent [19]
Hawkins et al.

[11] 3,767,508
[45] Oct. 23, 1973

[54] ROTARY HEAT SEALER
[75] Inventors: Albert W. Hawkins, Princeton; Ronald J. O'Shea; Herbert M. Case, both of Somerville, all of N.J.
[73] Assignee: Union Carbide Corporation, New York, N.Y.
[22] Filed: Oct. 4, 1971
[21] Appl. No.: 186,261

[52] U.S. Cl. ................ 156/389, 156/515, 156/583
[51] Int. Cl. ...................... B32b 31/00, B30b 15/34
[58] Field of Search .................. 156/251, 515, 582, 156/583, 389

[56] References Cited
UNITED STATES PATENTS
3,122,466   2/1944   Shabram ........................... 156/515
2,660,218   11/1953  Johnson et al. ..................... 156/515
2,229,121   1/1941   Nye et al. ........................... 156/515

Primary Examiner—Douglas J. Drummond
Attorney—Paul A. Rose et al.

[57] ABSTRACT

Apparatus and method are provided for heat-sealing multi-ply layers of thermoplastic film comprising a rotating drum having at least one outwardly opening recessed area extending across the surface thereof essentially parallel to the axis about which the drum is rotating; heat sealing means movably mounted within the recessed area of said drum; means for supporting a continuous ribbon of multi-ply layer of heat-sealable thermoplastic film about at least a portion of the peripheral surface of said drum and bridging the recessed area therein; means for traversing said heat sealing means in a radial direction within the recessed area of said drum between a retracted position with the heat sealing means totally within the recessed area of said drum and an extended position with the heat sealing means projecting beyond the surface of said drum; and means for discharging seamwelded film segments from about said drum.

9 Claims, 7 Drawing Figures

INVENTORS.
ALBERT W. HAWKINS
RONALD J. O'SHEA
HERBERT M. CASE
BY
ATTORNEY

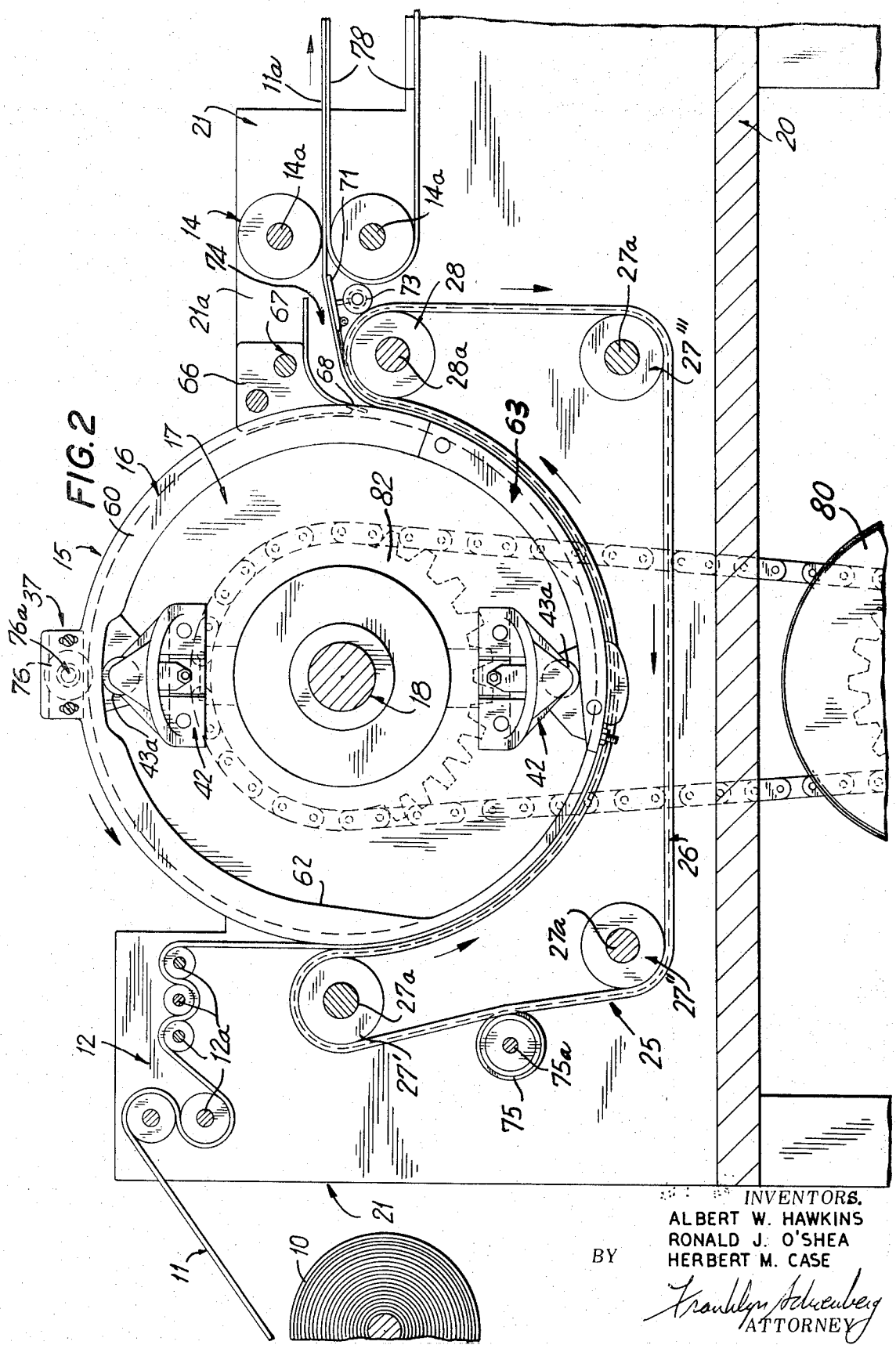

PATENTED OCT 23 1973

INVENTORS.
ALBERT W. HAWKINS
RONALD J. O'SHEA
HERBERT M. CASE

BY Franklyn Schoenberg
ATTORNEY

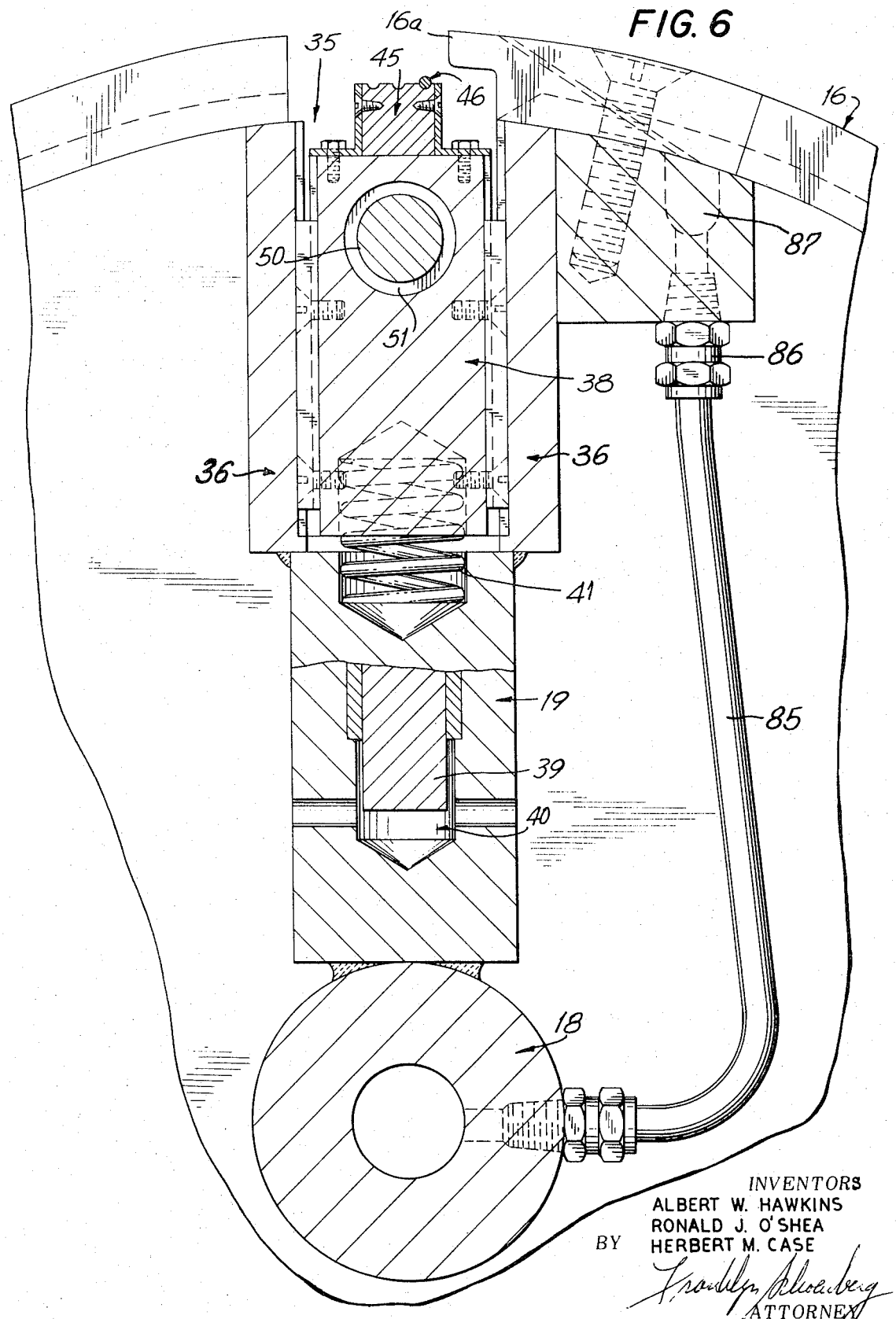

ROTARY HEAT SEALER

The present invention relates to a method and apparatus for heat sealing thermoplastic film and more particularly to an improved apparatus for simultaneously forming welded seams in a continuous multi-ply ribbon of thermoplastic film and severing the adjacent segments of welded film.

Numerous heat sealing devices and apparatus employing such devices are known and used commercially in the manufacture of a multitude of products from resinous thermoplastic films. The type of welded seam, the strength, quality and uniformity required for the welded seam and the desired size and number of articles are major factors contributing to the complexity and cost of the apparatus. In general, most commercial automatic apparatus for the fabrication of bags and the like from heat sealable, thermoplastic film are complex and expensive and while versatile as to the variety and sizes of product that can be fabricated, they are not usually fast or efficient enough when large quantities of a single size of product is desired.

It is an object of the present invention to provide an apparatus and method to automatically, rapidly and uniformly fabricate large quantities of strong, welded seams in multi-ply layers of thermoplastic film.

It is another object of the present invention to provide an apparatus and method to automatically and rapidly fabricate welded seams of uniform quality in continuous ribbons of multi-ply layers of thermoplastic film and simultaneously sever successive segments of welded articles into separate seam-welded articles.

It is another object of the present invention to provide an apparatus for automatically and rapidly fabricating welded seams in continuous ribbons of multi-ply layers of thermoplastic film that is relatively inexpensive to manufacture and maintain and that can be adapted to variations in size of articles to be produced.

Other objects of the present invention will become apparent from the following detailed description taken in connection with the accompanying drawing.

It has now been found that the object of the invention can be generally attained by providing apparatus comprising a drum rotatably mounted about its longitudinal axis having at least one outwardly opening recessed area disposed across its peripheral surface and essentially parallel to the axis thereof; means for rotating said drum about its axis; heat sealing means movably mounted within the recessed area of said drum; means for supporting a continuous ribbon of multi-ply heat sealable thermoplastic film about at least a portion of the surface of said drum and bridging the recessed area therein; means for reciprocally traversing said heat sealing means in a radial direction within the recessed area of said drum in and out of uniform positive engagement with film bridging said recessed area to weld together into separable parallel seams the multi-ply layers of said film, the parallel seams being readily separable upon retraction of said heat sealing means from engagement therewith.

In one embodiment, the apparatus of the present invention comprises film feed means adapted to deliver at least two layers of heat-sealable thermoplastic film; a rotatable drum mounted adjacent to and aligned with said film feed means, said drum having an outwardly opening recessed area in the peripheral surface thereof extending across the surface of the drum substantially parallel to the longitudinal axis about which said drum rotates. A film support means is provided comprising a driven endless belt trained about suitably arranged rollers at least one of which is driven, one of said rollers being aligned with the film feed means and another being aligned with film take-off means, a portion of the outer surface of said belt being trained about the lower portion of the circumference of said rotatable drum. A plurality of spaced, parallel grooves are circumferentially inscribed about the periphery of said drum and spaced parallel grooves are longitudinally inscribed in the endless belt film support means.

Driving means are provided for said drum and said film support means, the peripheral surface speed of said drum and film support means being syncrhonized to maintain the supported film in a substantially untensioned state.

Heat sealing means is provided which is slideably mounted within the recessed area of said drum, said heat sealing means comprising a wire heating element maintained under uniform tension and temperature over its entire length, the wire heating element thereof preferably positioned adjacent the rear edge of the recessed area and parallel to the drum surface. Means are provided for reciprocally transversing the heat-sealing means in a radial direction within the recessed area of the drum in and out of uniform positive engagement with film bridging the recessed area of said drum whereby such engagement of heat sealing means and bridging film simultaneously welds together in adjacent parallel "sideweld" seams the multiply layers of said film, the parallel adjacent "sideweld" seams being readily separable upon retraction of said heat sealing means from engagement therewith. Means are also provided for removing the separable sealed segments of film from the surface of the drum and the film support belt, said means comprising a plurality of appendages mounted adjacent the rotating drum and film support belt beyond the heat sealing zone, aligned with and registered within the grooves inscribed in the surfaces of the drum and film support belt.

Upon removal of the heat sealed layers of film from the drum and belt surfaces, the film may be conveyed for further processing by any of the methods well known in the art.

The apparatus of the present invention not only rapidly and simultaneously produces uniform separable parallel welded seams in multi-ply layers of thermoplastic film but, advantageously, the welded seam produced is known in the art as "sidewelded seams" which in general are stronger and being formed at the extreme edge of each successive separable sealed article, reduces the excess flash of thermoplastic film between adjacent welded seams. Further, the apparatus can be run at very high speed which, depending on the size of article desired, can produce, for example, as many as 160, and even more, uniformly sized 30 inches long separately sealed articles per minute. The apparatus requires simple maintenance procedures, the heat sealing means, for example, being readily replaceable and the size and quantity of articles to be produced can be readily varied by simple adjustments in the rotating speed of the drum or the dwell cycle of the reciprocating heat sealing means or by changing the diameter of the rotating drum.

The apparatus and method of the present invention will become apparent from the following description thereof when considered together with the accompanying drawing which is set forth as being exemplary of one embodiment of the present invention and is not intended, in any way, to be limitative thereof and wherein:

FIG. 2 is a side elevation view schematically illustrating one embodiment of the apparatus of the present invention;

FIG. 6 is a fragmentary elevation part in section, part broken away, taken through line 6—6 of FIG. 5;

Figure 1:
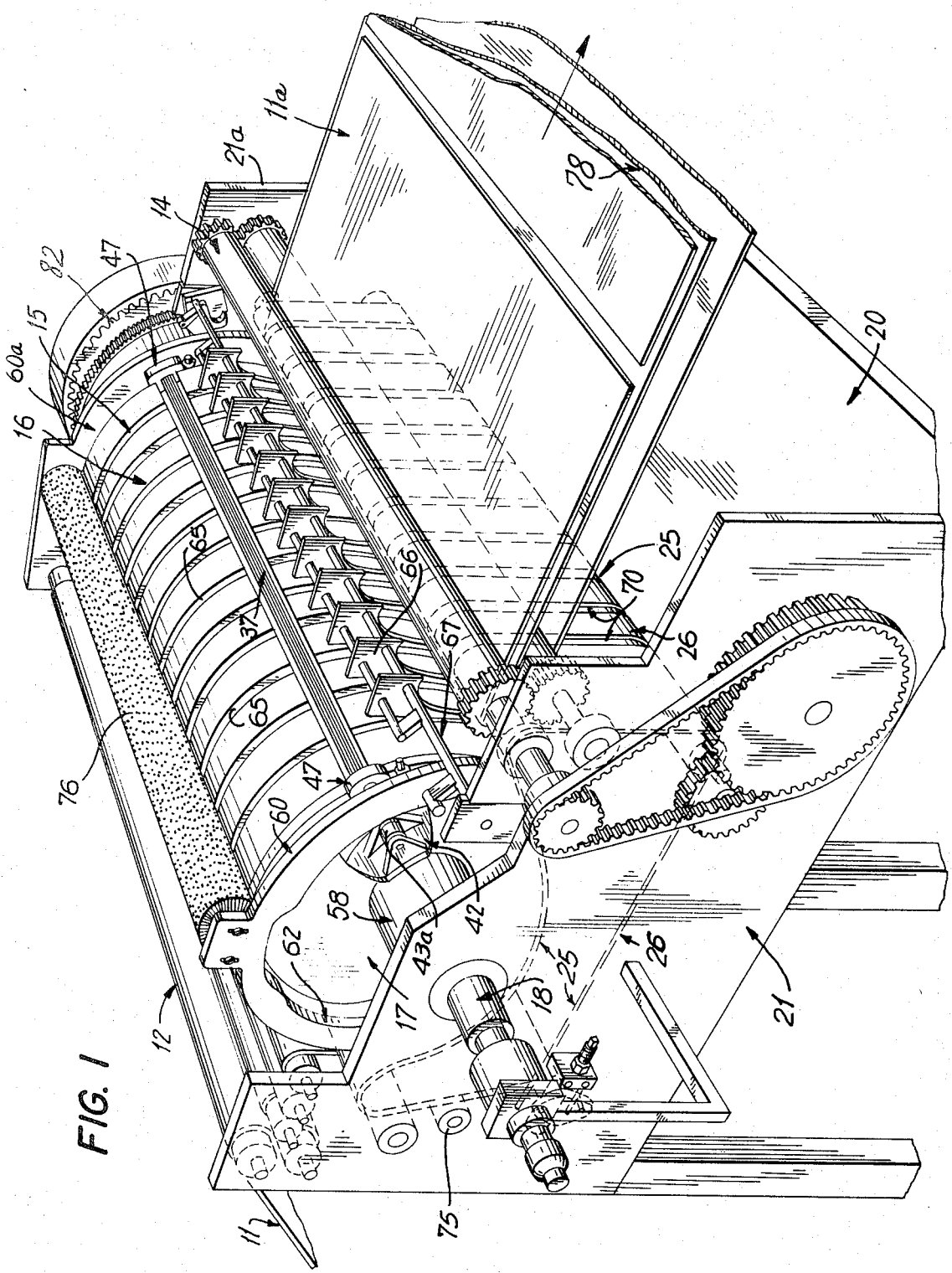
FIG. 1 is a perspective view of one embodiment of the present invention.

Turning now to the drawing, wherein like reference numerals denote like parts, there is shown in FIG. 1 a perspective representation and FIG. 2 a schematic representation of a general assembly of one embodiment of the sealing apparatus that incorporates the essential features of the present invention. The stock of continuous multi-ply layers of resinous thermoplastic heat-sealable film in which welded seams are to be formed is in the form of an endless web 11 supplied in roll form 10. The web may comprise a sheet material which has been folded longitudinally to provide two or more layers of film or it may be a flattened tube of film or two or more separate layers of sheet material.

Cylindrical drum assembly 15 and associated apparatus is mounted on supporting frame 20 as shown in FIGS. 1 and 2. Side frame members 21 and 21a, support drum assembly shown generally as 15, film feed rolls 12, film support means shown generally as 25 and film take off rolls 14. The film support means comprises an endless belt 26 preferably having a resilient heat resistant outward facing surface trained about support rolls 27', 27'', 27''' and 28 and the peripheral surface of the lower portion of drum assembly 15. The belt support rolls 27 and 28 are mounted on cross shafts 27a and 28a journaled at their ends in suitable end bearings in side frame members 21 and 21a. Film feed rolls 12 and film take off rolls 14 are mounted on cross shafts 12a and 14a, respectively, journaled in suitable bearings in side frame members 21 and 21a.

Referring to FIGS. 1, 2, 3 and 4, drum assembly 15 comprises a cylindrical body member 16 and front and back side plates 17 which support body member 16 on cross shaft 18 which is journaled in bearings in side frame members 21 and 21a. Outwardly opening recessed area 35 having parallel side walls 36 is provided in the external surface of drum assembly 15 and extends axially across the face of cylindrical body 16 and through front and back side plates 17. Mounted within outwardly opening recessed area 35 is heat sealing assembly shown generally as 37 which extends at its ends beyond drum side plates 17. At least one of said recessed areas 35 with heat sealing assembly 37 mounted therein is provided in the surface of drum assembly 15, the number of such recessed areas provided and the location thereof about the circumference of the drum being generally dependent on the quantity and dimensions of the film articles to be produced and the diameter of the drum.

Figure 4:
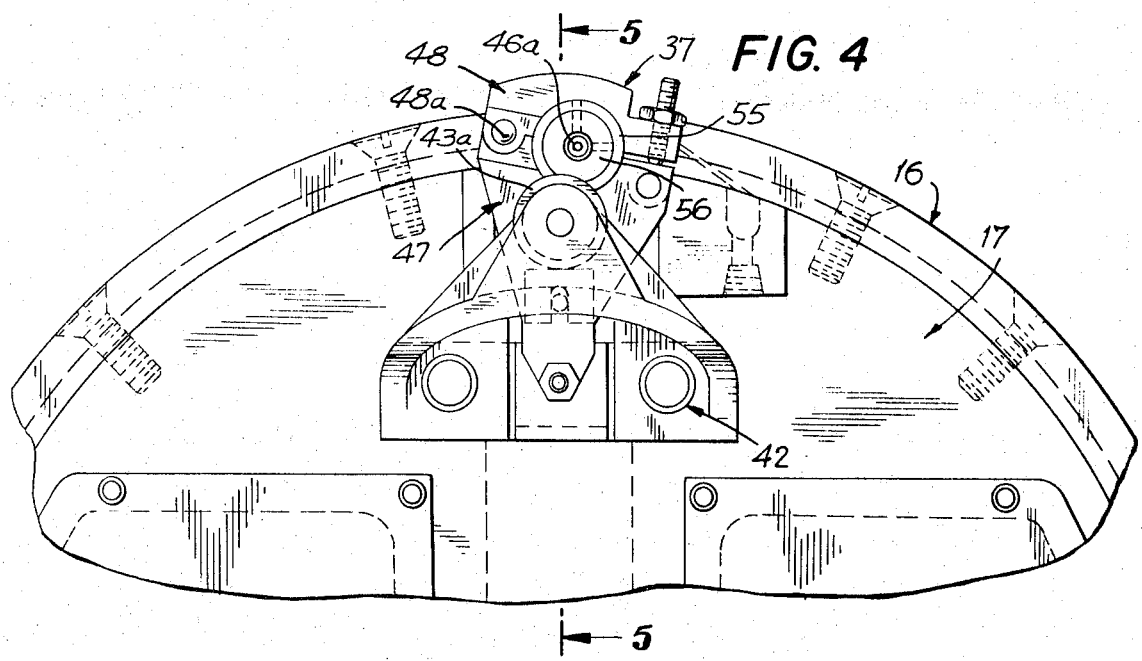
FIG. 4 is a fragmentary elevation view illustrating a broken away section of the rotatable drum of the apparatus of FIGS. 1 and 2 having heat sealing means mounted therein.
Figure 5:
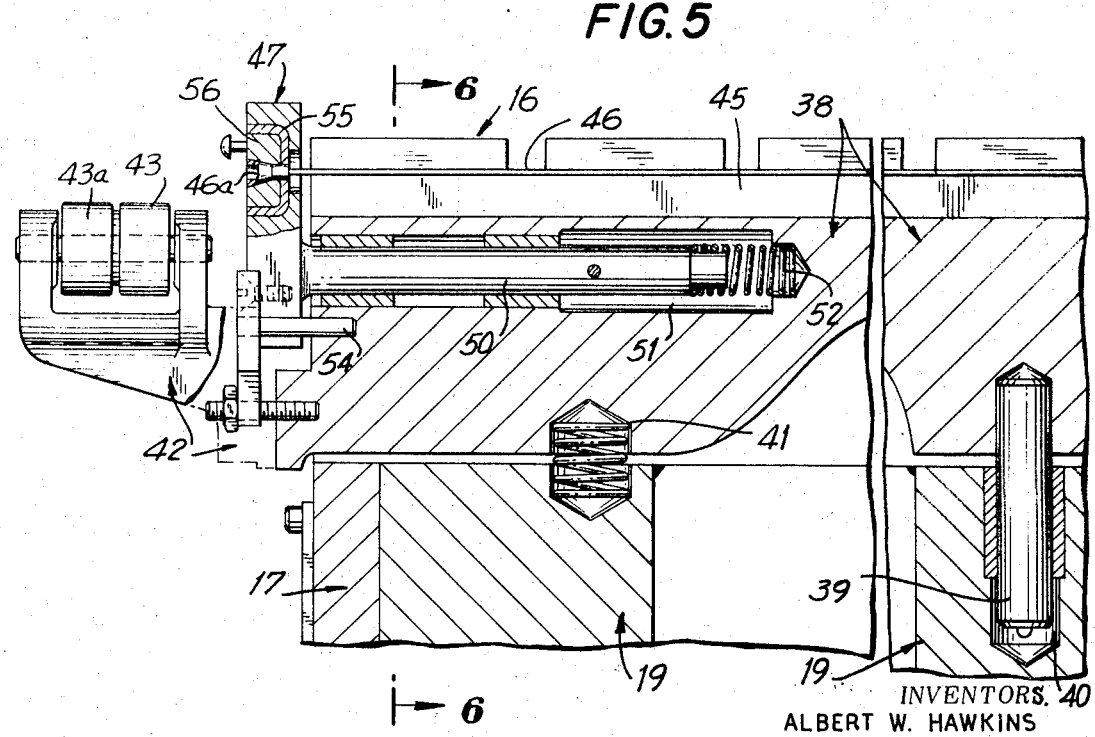
FIG. 5 is a sectional view, part broken away, taken through line 5—5 of FIG. 4.

Referring now to FIGS. 4, 5 and 6, heat sealing assembly 37 comprises bar 38, bar supports 42, insulator 45, and heat sealing wire 46. Bar 38 is slideably mounted within recessed area 35 between walls 36. Guide post 39 secured at about the midpoint of said bar 38 and extending downwardly therefrom is slideably confined in bore 40. Bore 40 is located in reinforcing member 19 which extends between front and back side plates 17 of drum assembly 15. Bar 38 extends substantially across the entire length of recessed area 35. Intermediate each end of bar 38 is interposed compression spring 41 between the bottom of bar 38 and reinforcing member 19 so as to provide a resilient mounting for bar 38. At each end of bar 38 and extending beyond front and back side plates 17 is mounted bar support 42 on each of which are rotatably mounted cam follower rollers 43 and 43a. Insulator 45 is secured to the top surface of bar 38 extending the entire length thereof. Heat sealing wire 46 extends across the open face of insulator bar 45 and is mounted at its ends in wire holders 47 and 47( a) (FIG. 1). Wire holder 47(a) is secured to one end of bar 38 and wire holder 47 is secured to slide rod 50 which is slideably confined in bore 51 in the other end of bar 38. A compression spring 52 is interposed between the outside face of slide rod 50 and inside face of bore 51 so as to maintain heat sealing wire 46 under tension. Guide pin 54 passes through slideably mounted wire holder 47 and is secured in bar 38 thereby keeping slideably mounted wire holder 47 from rotating. Wire holders 47 and 47(a) have hinged top portions 48 openable about pivot 48a and secured closed by fastener 49 to enable ready installation and removal of the heat sealing wire assembly from the wire holders 47 and 47(a). The ends of heat sealing wire 46 are swaged as shown at 46a (FIGS. 4 and 5) to enable retention thereof in retention block 56 and insulator block 55 which are secured in wire holders 47 and 47(a ) by hinged top portions 48. Any of the electrical resistance wire materials well known in the art may be employed as heat sealing member 46 in the apparatus of the present invention. Whereas numerous resistance wire materials of a wide range of wire diameters may be suitable, nickel-chromium alloy resistance wire of from about 0.050 inch to 0.070 inch in diameter has been advantageosly employed. It would be obvious to those having skill in the art that heat sealing members of configurations other than a uniform diameter heat sealing wire may also be suitable. However, sealing members having a relatively small radius arcuate sealing edge as, for example, the edge of the sealing wire hereinabove described, are especially suitable and preferred for simultaneously affecting parallel, separable "sidewelded" seams in multi-ply layers of thermoplastic film. Heat sealing wire 46 is supplied with current through suitable connections with commutator rings 58 (see FIGS. 1 and 2) mounted on drum assembly shaft 18.

Referring now to FIGS. 1 and 2, cam rings 60 and 60(a), vertically mounted from side frame members 21 and 21(a) respectively about rotating drum shaft 18, are located spacedly adjacent drum side plates 17 substantially concentric with cylindrical drum body member 16. The inside surface of cam rings 60 and 60(a)

having substantially identical configurations serve as cam tracks 62. Cam follower rollers 43 mounted at each end of bar 38 of heat sealing assembly 37 (FIG. 5) engage cam tracks 62 of cam rings 60 and 60(a). Cam track segments 63 are secured to corresponding sections of cam rings 60 and 60(a) and intermittently engage cam follower rollers 43(a) mounted adjacent cam rollers 43 at each end of bar 38 (FIG. 5) during the rotation cycle of drum assembly 15.

Figure 7:
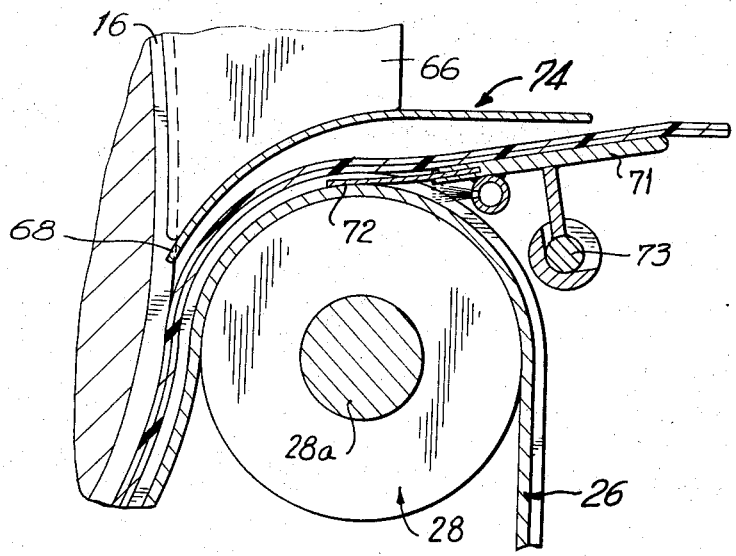
FIG. 7 is an enlarged fragmentary side elevation illustrating the film take-off means of the apparatus of FIG. 1 and 2.

Referring now to FIGS. 1, 2 and 7 wherein is illustrated (FIG. 7) an enlarged fragmentary side elevation of the film discharge means shown generally as 74 of the apparatus of FIGS. 1 and 2 which serves to discharge sealed segments of film from about cylindrical drum 15 and support belt 26 and guide said film to take-off rolls 14. A plurality of spaced parallel plates 66 are secured to shaft 67 whichis rotatably mounted adjacent the film discharge end of drum assembly 15. Extending downwardly from parallel plates 66 are flexible appendages 68 which are registered in outwardly opening grooves 65 circumferentially inscribed in the surface of cylindrical body member 16. Film take-off plate 71 having a plurality of spaced flexible appendages 72 extending therefrom is secured to shaft 73 which is freely mounted at the discharge end of drum assembly 15 spacedly adjacent to roller 28. Endless belt 26 trained about rollers 27 and 28 has a plurality of spaced, parallel, outwardly opening grooves 70 longitudinally inscribed in the surface thereof. Appendages 72 extending from plate 71 are registered within grooves 70 in the surface of belt 26 trained about roller 28.

Grooves 65 in the surface of body member 16 and grooves 70 in the surface of belt 26 ae spacedly inscribed across essentially the entire surface width thereof. The spacing and width of the grooves are, in general, dependent on being able to readily discharge the film from the surface of the drum assembly 15 and support belt 26 and afford uniform support for the layers of film during the heat sealing operation. In general, the grooves may be spaced between about 2 inches to 4 inches apart and the width of the groove may vary between 1/4 inch and 1/2 inch.

Film take away rolls 14 (FIGS. 1 and 2) comprises adjacent upper and lower rolls mounted on cross shafts 14(a) journaled in suitable bearings in side frame members 21 and 21(a) in alignment with and spacedly adjacent to film discharge means 74. An endless belt 78 trained about lower roll 14 serves to convey sealed film 11(a) discharged from drum assembly 15 to subsequent handling stations.

In a particularly preferred embodiment of the apparatus of the present invention, as illustrated in FIGS. 1 and 2, endless support belt cleaning brush 75 rotatably mounted on shaft 75(a) and heat sealing wire cleaning brush 76 rotatably mounted on shaft 76(a) may be incorporated.

Illustrated in FIG. 6 is an alternate embodiment of the present invention wherein air duct 85 is secured at one end in shaft 18, which is hollow and connected to an outside positive low pressure air source (not shown). At the other end, air duct 85 is secured in connector 86 which forms a continuous channel with port 87 opening on the surface of cylindrical body member 16. A plurality of such ducts 85 and ports 87 may be provided to supply low pressure air to the surface of cylindrical body member 16 preferably adjacent the back edge of recessed area 35 to assist in the discharge of sealed film 11(a) from about the surface of cylindrical member 16.

The drum assembly 15, film feed rolls 12, film support means 25 and film take-off rolls 14 are all driven by connection with a variable speed drive unit shown at 80 on FIG. 2. The variable speed drive unit 80 is connected by timing belt 81 to timing belt sheave 82 carried on drum assembly shaft 18. A gear (not shown) carried on shaft 18 is in driving engagement with a train of gears on shafts 14a, 28a and 12a.

A typical operation of a preferred embodiment of the apparatus of the present invention will now be described and will be more readily understood when considered together with FIGS. 1–7.

In operating the apparatus of the present invention, a continuous web of multi-ply layers of film 11 is fed by film feed rolls 12 between revolving support belt 26 trained about roll 27' and revolving drum assembly 15 and is advanced while being supported therebetween. The peripheral surface speeds of film support belt 26 and drum assembly 15 are synchronized to advance film web 11 and support it therebetween in a substantially untensioned state.

The advancing, supported film web bridges outwardly opening recessed area 35 in drum assembly 15 and is engaged by heat sealing wire 46 of reciprocally mounted heat sealing assembly 37 for a period of time sufficient to effect welding of the plies of film web 11 into parallel, separable seams. As drum assembly 15 rotates, heat sealing assembly 37 reciprocally traverses within recessed area 35 from a retracted position wherein heat sealing assembly 37 resides totally within the depth of recessed area 35 and wire 46 is completely withdrawn from the surface of cylindrical body member 16 to an outwardly extending heat sealing position with heat sealing wire 46 projecting beyond the surface of cylindrical body member 16 and engaging film plies 11 bridging recessed area 35 and then again to its retracted position. Compression springs 41 interposed between bar 38 of heat sealing assembly 37 and support member 19 constantly urges heat sealing assembly 37 radially outwardly. Engagement of cam rollers 43, mounted on each end of heat sealing assembly 37, with cam track 62 of cam rings 60 and 60(a) and the intermittent engagement of cam rollers 43(a), mounted adjacent rollers 43, with cam track segments 63 secured to cam rings 60 and 60(a) counteracts the outward urging of springs 41 and the path formed thereby determines the reciprocal travel path of heat sealing assembly 37 as drum assembly 15 rotates about shaft 18.

The angle of rotation of drum assembly 15 during which heat sealing wire 46 engages film 11 bridging recessed area 35 may vary from about 10°and 150°and preferably from about 30°and 90°. In no event should heat sealing assembly 37 remain in its extended position beyond the film discharge point of the apparatus. The period of engagement between heat sealing wire 46 and film web 11 and the termperature of the heat sealing wire, in general, depends upon the type of film to be welded and the rate at which drum assembly 15 is revolving.

Heat sealing wire 46 is electrically energized to sealing temperature upon starting the rotation of drum assembly 15 and is thereafter maintained at a constant heat sealing temperature.

Figure 3:
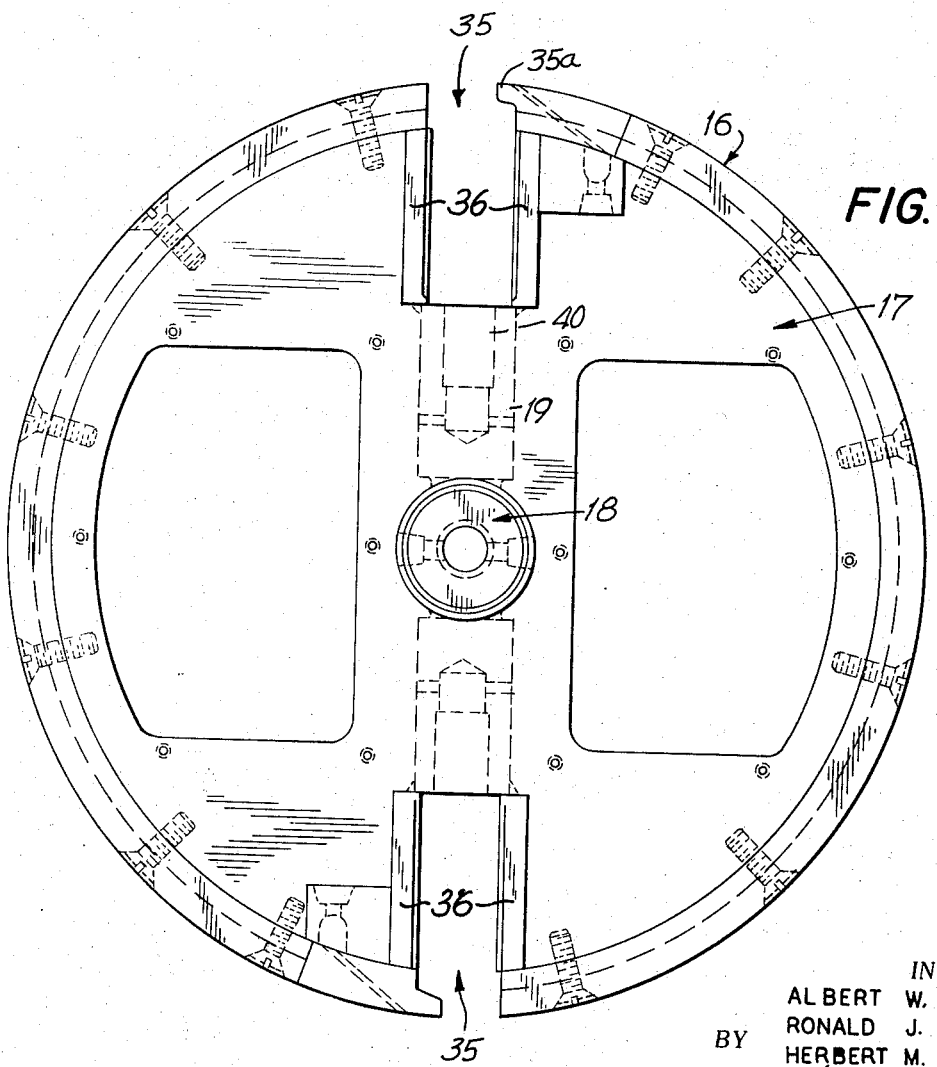
FIG. 3 is a side elevation view of the rotatable drum of the apparatus of FIGS. 1 and 2.

The temperature at which heat sealing wire 46 may be used will, in general, range between about 600° F.

and 800° F. depending on the type of film to be heat sealed. Further, heat sealing wire 46 is maintained under constant tension and essentially parallel to the surface of body member 16 in order that there is a uniform contact time and pressure with film 11. Compression spring 52 (FIG. 5) interposed between slide rod 50 secured to wire holder 47 and bore 51 constantly urges wire holder 47 outwardly to maintain heat sealing wire under uniform tension. In FIG. 3 is shown lip 35(a) which extends from the surface of body member 16 over the rear portion of recessed area 35 and has been advantageously employed in providing additional support for film 11 being engaged by heat sealing wire 46 and further assists in the discharge of said sealed film from about the surface of body member 16.

Drum assembly 15 may be rotated at a speed up to about 100 revolutions/min. or even faster, the speed of rotation, in general, dependent only on the size of the drum and the size and quantity of the sealed products to be produced. A unique feature of the apparatus of the present invention is the fact that automatic continuously operating apparatus rapidly and effectively feed a continuous ribbon of multi-ply layers of film to heat sealing means wherein parallel, separable side weld seams are formed in the layers of film, and the sealed film segments are then discharged therefrom.

Seamwelded film 11(a) is discharged from about drum assembly 15 and support belt 26 by film discharge means 74 and guided therefrom to take-off rolls 14 onto conveyor belt 78. As shown in FIGS. 1, 2 and 7, appendages 68 registered in outwardly opening grooves 65 in body member 16 and appendages 72 registered in grooves 70 in the surface of belt 26 serve to discharge seamwelded film 11(a) from the surfaces of the rotating drum assembly 15 and revolving support belt 26 respectively onto guide plate 71 which then guides film 11(a) between film take-off rolls 14 onto conveyor belt 78. Film take-off rolls 14 may be rotated at a somewhat greater rate than that of rotating drum 15 thereby further separating the seamwelded segments of film as they are deposited on belt 78.

To prevent segments of film from accumulating on the surfaces of support belt 26 and heat sealing wire 46, it has been found advantageous to employ cleaning means that will continually remove any accumulated film. Rotatably mounted cleaning brush 75, which may be separately driven, constantly sweeps the surface of support belt 26 clean of film that has adhered thereto during the heat sealing operation. Rotatably mounted cleaning brush 76 engages and sweeps the surface of heat sealing wire 46 during each rotation of drum assembly 15. Heat sealing assembly 37 is traversed to its outwardly extending position during the portion of the rotation cycle of drum assembly 15 when cleaning brush 76 engages sealing wire 46.

From the foregoing, it will be seen that the present invention provides apparatus that is capable of automatically and rapidly producing uniform, strong welded seams in multiply layers of thermoplastic film while simultaneously severing said film into separate seamwelded segments. The apparatus is adaptable for use with any heat-sealable thermoplastic film as, for example, polyethylene, polyvinyl-chloride and the like and may be employed to rapidly prepare articles of a wide range of sizes.

While in the foregoing specification embodiments of the invention have been set forth in considerable detail for purposes of making a complete disclosure thereof, it will be apparent to those skilled in the art that numerous changes may be made without departing from the spirit and principles of the invention.

What is claimed is:

1. An apparatus for heat sealing multiply layers of thermoplastic film comprising in combination:
 a a drum rotatably mounted about its longitudinal axis having at least one outwardly opening recessed area extending across the peripheral surface thereof essentially parallel with the axis of the same;
 b means for rotating said drum about its axis;
 c heat sealing means movably mounted within the recessed area of said drum;
 d means for continuously energizing said heat sealing means and maintaining a substantially uniform temperature across its entire length;
 e means for feeding a continuous ribbon of multi-ply layers of heat-sealable thermoplastic film to said drum;
 f means for supporting a continuous ribbon of thermoplastic film in an untensioned state about at least a portion of the peripheral surface of said drum and bridging the recessed area therein;
 g means for driving said film support means independent of said drum rotating means at a speed to maintain film supported thereby in a substantially untensioned state;
 h means for cleaning the surface of said film support means;
 i means for traversing said heat sealing means during each revolution of said drum in a radial direction within the recessed area of said drum between a retracted position with the heat sealing means totally within the recessed area of said drum and an extended position with the heat sealing means projecting beyond the surface of said drum;
 j means for discharging seamwelded film segments from about said drum and from said film support means.

2. The apparatus of claim 1 wherein said film supporting means is a driven endless belt, the peripheral surface speed of said endless belt and said drum surface being substantially the same.

3. The apparatus of claim 1 wherein said heat sealing means extends substantially the entire length of the recessed area in said rotatable drum.

4. The apparatus of claim 3 wherein said heat sealing means comprises a heat sealing wire disposed parallel to the surface of said drum over substantially its entire length.

5. The apparatus of claim 1 comprising heat sealing means for simultaneously heat sealing layers of thermoplastic film and severing said film into successive segments of seamwelded film.

6. The apparatus of claim 1 wherein said drum has a plurality of outwardly opening, parallel grooves circumferential inscribed in the surface thereof 7. The apparatus of claim 6 wherein said film discharge means comprises a plurality of appendages mounted adjacent said drum and registered within the grooves circumferentially inscribed in the surface thereof.

8. The apparatus of claim 1 wherein said heat sealing means is in its extended position while said drum rotates through an angle of between about 10° and 150°.

9. The apparatus of claim 2 wherein said driven endless belt has a plurality of outwardly opening parallel grooves longitudinally inscribed in the surface thereof and wherein film discharge means comprises a plurality of appendages mounted adjacent the film discharge end of said belt and registered within grooves in the surface of said endless belt.

* * * * *

UNITED STATES PATENT OFFICE
CERTIFICATE OF CORRECTION

Patent No. 3,767,508  Dated October 23, 1973

Inventor(s) Albert W. Hawkins et al.

It is certified that error appears in the above-identified patent and that said Letters Patent are hereby corrected as shown below:

Column 8, line 6, "multiply" should read -- multi-ply --.

Column 8, lines 58-59, "circumferential" should read -- circumferentially --.

Signed and Sealed this sixteenth Day of August 1977

[SEAL]

Attest:

RUTH C. MASON
Attesting Officer

C. MARSHALL DANN
Commissioner of Patents and Trademarks